(No Model.)
J. C. CREVELING.
KNIFE FOR CUTTING OIL CLOTH.
No. 601,315. Patented Mar. 29, 1898.
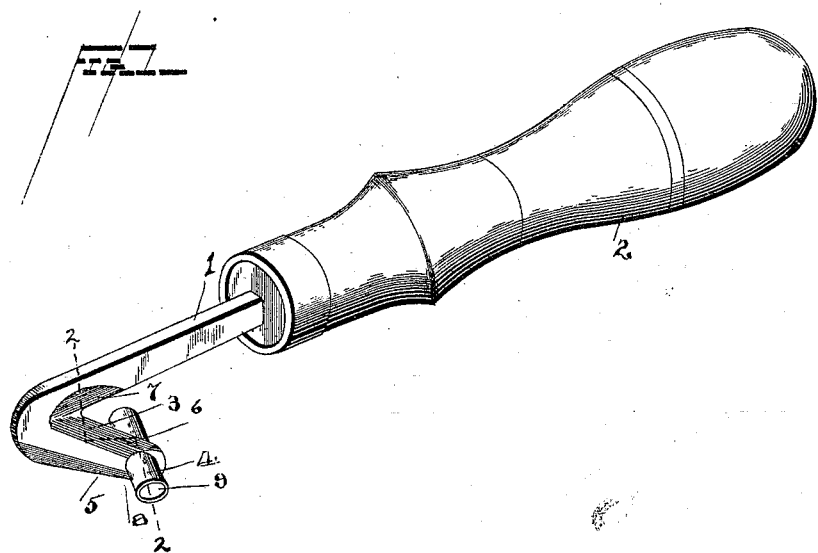
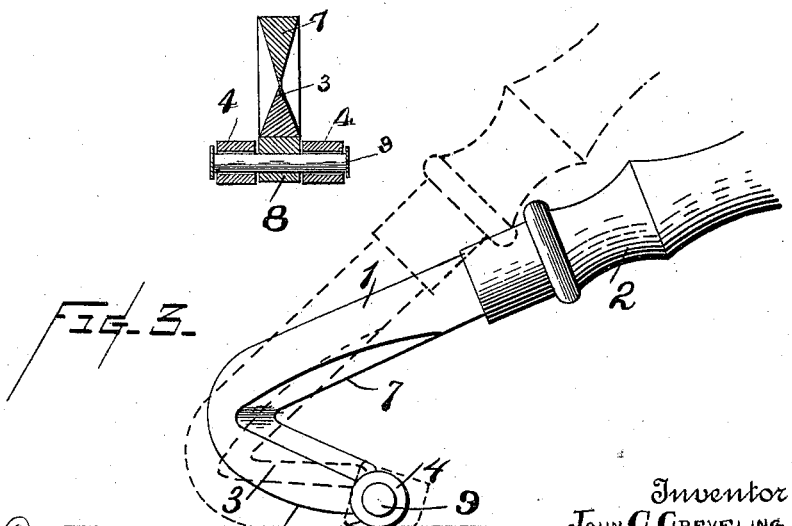
Witnesses
W. S. Van Loan.
Victor J. Evans
Inventor
John C. Creveling.
by John Wedderburn.
Attorney

UNITED STATES PATENT OFFICE.

JOHN C. CREVELING, OF ESPY, PENNSYLVANIA.

KNIFE FOR CUTTING OIL-CLOTH.

SPECIFICATION forming part of Letters Patent No. 601,315, dated March 29, 1898.

Application filed September 4, 1897. Serial No. 650,659. (No model.)

*To all whom it may concern:*

Be it known that I, JOHN C. CREVELING, a citizen of the United States, residing at Espy, in the county of Columbia and State of Pennsylvania, have invented certain new and useful Improvements in Knives for Cutting Oil-Cloth; and I do hereby declare the following to be a full, clear, and exact description of the invention, such as will enable others skilled in the art to which it appertains to make and use the same.

My invention relates to improvements in knives for cutting oil-cloths and the like; and it consists in the construction and arrangement of parts which will be fully described hereinafter and especially referred to in the claims.

The object of my invention is to provide a knife adjusted to cut oil-cloths either by a pushing or a drawing action by providing the handle or shank of the knife with a downwardly and rearwardly extending cutter having at its lower end a roller or rollers whereby in the pushing operation the knife is held out of contact with the cloth being cut by the rollers and is brought in contact therewith in front of the rollers by throwing the handle upward, all of which will be more fully described hereinafter.

In the accompanying drawings, Figure 1 is a perspective view of a knife embodying my invention. Fig. 2 is a vertical sectional view taken on the line 2 2 of Fig. 1. Fig. 3 is a side elevation of the cutter complete, showing the cutter in solid lines out of its cutting position and in its cutting position in dotted lines.

Referring now to the drawings, 1 is a shank, which is fixed in a handle 2 in any suitable manner.

The cutter consists of a rearwardly and downwardly projecting arm having its front edge tapered to a cutting edge 5 and its rear edge tapered to a cutting edge 3. The extremity 8 of this arm is enlarged, as shown in the cross-sectional view of Fig. 2, and passing through this enlarged portion is a shaft or bearing 9, carrying the rollers 4 at each side of the enlargement 8. By reference to Fig. 2 it will be noted that the peripheries of the rollers are in a plane below the plane of the extremity of the arm, whereby the arm is out of contact with the material being cut.

The under side of the shank 1 is tapered to a cutting edge 7, and in conjunction with the cutting edge 3 forms a V-shaped cutter for cutting the material by a drawing action.

In Fig. 3 the cutter is shown in position for cutting by a pushing operation. In this instance the rollers rest upon the top of the cloth, as shown, and in solid lines the cutter is shown out of contact with the cloth. When in cutting position, the handle is thrown upward, as shown in dotted lines, which brings the knife forward in front of the rollers down upon and in contact with the cloth, so that the cutter as pushed forward cuts through the cloth and the roller serves to hold the cloth down and to make the cutter steady in its operation and enabling the cloth to be more easily cut in a straight line.

The cutter is also adapted to be used as a drawing cutter by placing it under the cloth, and the cloth is then cut by the cutting edges 3 and 7. In this operation the rollers still perform a useful function in that by putting considerable pressure on the rollers the implement is held steady and a much straighter and easier cut is made than when rollers are not provided.

While I here show rollers connected to the lower end of the cutter-arm, it will be readily understood that the arm itself, being enlarged, will form a support, and that the broad idea of the cutter is the rearwardly and downwardly extending arm having its lower extremity adapted to support the cutter and the front edge of the arm shaped to a cutting edge at a point above its lower extremity, whereby the action is that herein shown and described.

Having thus described my invention, what I claim, and desire to secure by Letters Patent, is—

1. A cutter of the character described comprising a shank, having a downwardly and rearwardly extending cutter-arm, the extremity of the cutter-arm forming a support for the tool, and the front edge thereof tapered to a cutting edge the same adapted to be operated as shown and described.

2. A cutter of the character described comprising a shank, a downwardly and rearwardly extending arm having its front edge formed into a cutter, its lower end provided with supporting-rollers, whereby the rollers are in rear of the cutter and the tool adapted to be operated as described.

3. A cutter of the character described comprising a shank, a downwardly and rearwardly extending arm having its lower end adapted to form a support, and the front edge of the arm sharpened to a cutting edge at a point above the said supporting portion of the arm, substantially as described.

4. A cutter of the character described comprising a shank, a downwardly and rearwardly extending arm, rollers situated at each side of the arm and supporting its extremities in a plane above the lower periphery of the roller, the front edge of the arm sharpened to a cutting edge at a point in a plane above the lower extremity, substantially as described.

5. A cutter of the character described comprising a shank, having a downwardly and rearwardly extending arm, supporting-rollers at the extremities of the arm with their lower periphery in a plane below the plane of the lower end of the arm, the front and rear edges of the arm being sharpened to a cutting edge, substantially as and for the purpose described.

6. A cutter of the character described comprising a shank, a downwardly and rearwardly extending cutter-arm having a laterally-projecting base or supporting portion at its extremity, the edge or edges of the arm being sharpened to a cutting edge, substantially as described.

In testimony whereof I have signed this specification in the presence of two subscribing witnesses.

JOHN C. CREVELING.

Witnesses:
D. Z. MENSCH,
R. R. ZAN.